United States Patent
Kikuchi et al.

(10) Patent No.: US 11,851,046 B2
(45) Date of Patent: Dec. 26, 2023

(54) HYBRID VEHICLE CONTROL METHOD AND HYBRID VEHICLE CONTROL DEVICE FOR SUPPRESSING SYSTEM RESONANCE OTHER THAN NATURAL VIBRATION

(71) Applicant: Nissan Motor Co., Ltd., Yokohama (JP)

(72) Inventors: Takahiro Kikuchi, Kanagawa (JP); Kengo Fujiwara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/042,609

(22) PCT Filed: Aug. 24, 2020

(86) PCT No.: PCT/JP2020/031900
§ 371 (c)(1),
(2) Date: Feb. 23, 2023

(87) PCT Pub. No.: WO2022/044092
PCT Pub. Date: Mar. 3, 2022

(65) Prior Publication Data
US 2023/0303060 A1    Sep. 28, 2023

(51) Int. Cl.
*B60W 20/15* (2016.01)
*B60W 30/20* (2006.01)
(Continued)

(52) U.S. Cl.
CPC ............. *B60W 20/15* (2016.01); *B60L 50/61* (2019.02); *B60W 30/20* (2013.01); *B60W 50/00* (2013.01);
(Continued)

(58) Field of Classification Search
None
See application file for complete search history.

(56) References Cited

U.S. PATENT DOCUMENTS

| 11,407,402 B2* | 8/2022 | Oh ........................ B60W 10/08 |
| 2017/0043677 A1 | 2/2017 | Ko et al. |
| 2020/0018248 A1 | 1/2020 | Anzawa |

FOREIGN PATENT DOCUMENTS

| CN | 109219545 A | 1/2019 |
| CN | 109305158 A | 2/2019 |

(Continued)

*Primary Examiner* — Todd Melton
(74) *Attorney, Agent, or Firm* — Global IP Counselors, LLP

(57) ABSTRACT

A hybrid vehicle control method controls a hybrid vehicle. In this control method, a rotational speed command value for a power generation system is determined in accordance with a state of a drive system, a torque command value is determined for the power generation system such that the rotational speed of the power generation system reaches the rotational speed command value, a damping control is performed to suppress a characteristic vibration component generated in a connection between the engine and the power generator to calculate a final torque command value for the power generation system, and the torque command value is set as the final torque command value without performing the damping control upon determining a system resonance can occur that is caused by vibration of a component different from the characteristic vibration component.

8 Claims, 10 Drawing Sheets

(51) Int. Cl.
*B60W 50/00* (2006.01)
*B60L 50/61* (2019.01)
*B60K 6/46* (2007.10)

(52) U.S. Cl.
CPC .......... *B60K 6/46* (2013.01); *B60L 2270/145* (2013.01); *B60W 2050/0008* (2013.01); *B60W 2510/0638* (2013.01); *B60Y 2200/92* (2013.01)

(56) References Cited

FOREIGN PATENT DOCUMENTS

| | | |
|---|---|---|
| DE | 10 2017 218 656 A1 | 4/2019 |
| JP | 2012-232690 A | 11/2012 |
| JP | 2015-74308 A | 4/2015 |
| JP | 2016-88306 A | 5/2016 |
| JP | 2018-95172 A | 6/2018 |

* cited by examiner

HYBRID VEHICLE CONTROL METHOD AND HYBRID VEHICLE CONTROL DEVICE FOR SUPPRESSING SYSTEM RESONANCE OTHER THAN NATURAL VIBRATION

CROSS-REFERENCE TO RELATED APPLICATIONS

This application is a U.S. national stage application of International Application No. PCT/JP2020/031900, filed on Aug. 24, 2020.

BACKGROUND

Technical Field

The present invention relates to a hybrid vehicle control method and a hybrid vehicle control device for controlling a hybrid vehicle.

Background Information

Configurations of electric vehicles are known in which a power generator is actuated by an engine such as an internal combustion engine, and electric power generated by the power generator is supplied to a motor of a drive system. Such electric vehicles are referred to as series hybrid vehicles because the power generation system and the drive system are connected in series. In such series hybrid vehicles, various characteristic vibrations may occur; one example is torsional vibration or another type of natural vibration occurring in a shaft that transmits torque occurring in the engine to the power generator.

JP 2015-074308 A discloses a feature of minimizing a natural vibration component generated in an electric vehicle. According to this feature, in a process of calculating a torque command value for a power generator, feedback (F/B) control is performed at the same time that feedforward (F/F) control is performed in order to control the vibration (damping).

Specifically, first, when the torque command value for the power generator is calculated, F/F filter processing is performed on a command value corresponding to a desired rotational speed to calculate an F/F torque command value. At the same time, F/B filtering is performed on a deviation between an estimated value and a measured value of rotational speed to calculate an F/B torque command value. The F/F torque command value and the F/B torque command value are added to derive a final torque command value for the power generator. By controlling the generator using such a final torque command value, it is possible to reduce the natural vibration component.

SUMMARY

In a power generation system, an attenuator or another connecting part may be provided between the engine and the power generator as a countermeasure against noise and vibration. In such a power generation system, during an engine misfire or the like, a periodic disturbance other than the basic order (natural vibration component) of the engine may occur at the connecting part, resulting in system resonance. Because the periodic disturbance that causes such system resonance is different from the natural vibration component, problems have been presented in that the periodic disturbance cannot be reduced even if the feature disclosed in JP 2015-074308 A is used.

Therefore, to resolve the problem described above, it is an object of the present invention to provide a method and device for controlling a hybrid vehicle in which system resonance caused by a periodic disturbance other than the natural vibration component is suppressed.

A hybrid vehicle control method according to a certain aspect of the present invention is a method for controlling a hybrid vehicle having a power generation system in which an engine and a drive shaft are connected and which includes a power generator configured to rotate together with the engine, and a drive system that is connected to the power generation system and driven by receiving electric power supplied from a chargeable battery. In this control method, a rotational speed command value for the power generation system is derived in accordance with a state of the drive system, a torque command value for the power generation system is derived such that the rotational speed of the power generation system reaches the rotational speed command value, damping control to suppress a natural vibration component generated in a part via which the engine and power generator are connected is performed on the torque command value to calculate a final torque command value for the power generation system, and when system resonance could occur as a result of vibration of a component different from the natural vibration component, the torque command value is established as the final torque command value without performing the damping control.

BRIEF DESCRIPTION OF THE DRAWINGS

Referring now to the attached drawings which form a part of this original disclosure.

DETAILED DESCRIPTION OF EMBODIMENTS

Embodiments of the present invention are described below with reference to the drawings.

First Embodiment

Figure 1:
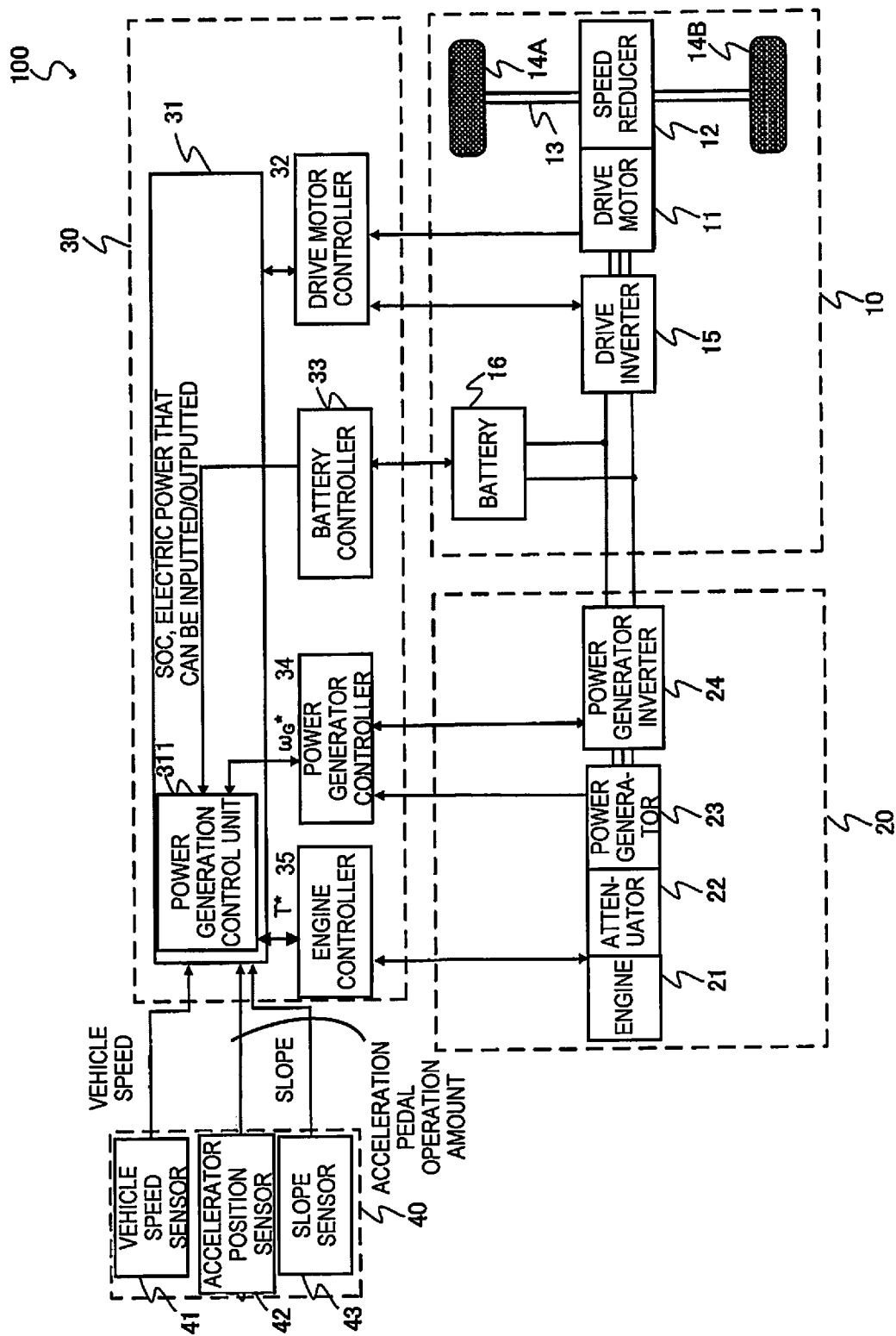
FIG. 1 is a schematic diagram of an electric vehicle according to a first embodiment.

FIG. 1 is a schematic diagram of an electric vehicle according to a first embodiment.

An electric vehicle 100 comprises a drive system 10 serving as a drive source, a power generation system 20 that supplies electric power to the drive system 10, and a control system 30 that controls the drive system 10 and the power generation system 20. The vehicle is also provided with a sensor group 40 that acquires values to be inputted to the control system 30. An electric vehicle having a configuration in which the power generation system 20 and the drive system 10 are connected in series in this manner is referred to as a series hybrid vehicle.

In the drive system 10, a drive motor 11 is connected to drive wheels 14A, 14B via a speed reducer 12 and a shaft 13. In addition, DC power supplied from a battery 16 is converted to AC power in a drive inverter 15. The drive motor 11 rotates by being supplied with the AC power converted by the drive inverter 15, whereby the drive wheels 14A, 14B are driven. When the electric vehicle 100 performs regenerative braking, the AC power generated in the drive motor 11 is converted to DC in the drive inverter 15 and is then charged to the battery 16. Thus, the battery 16 is configured to be capable of charging and discharging.

In the power generation system 20, an engine 21 is connected to a power generator 23 via an attenuator 22, and the power generator 23 is rotated by the driving of the engine 21 to generate power. AC power generated by the power generator 23 is supplied to the drive system 10 after being converted to DC power by a power generator inverter 24.

The attenuator 22 is intended to suppress any fluctuation in torque transmitted from the engine 21 to the power generator 23, an example being a spring member provided between an inner hub connected to a shaft of the engine 21 and an outer hub connected to a shaft of the power generator 23. Having such a configuration, the attenuator 22 can absorb torque vibration caused by torsion of the inner hub and the outer hub. The attenuator 22 is one example of a part via which the engine 21 and the power generator 23 are connected; for example, a low-rigidity shaft connecting the engine 21 and the power generator 23 may be a connecting part.

The control system 30 controls the drive system 10 and the power generation system 20 on the basis of the vehicle speed, the amount of acceleration pedal operation, the slope, etc., inputted from the sensor group 40. The control system 30 includes a system controller 31 that unifies the system, a drive motor controller 32 and battery controller 33 that control the drive system 10, and a power generator controller 34 and engine controller 35 that control the power generation system 20.

The system controller 31 unifies all operations of the drive motor controller 32, the battery controller 33, the power generator controller 34, and the engine controller 35. A power generation control unit 311 provided inside the system controller 31 controls the battery controller 33, the power generator controller 34, and the engine controller 35. Thus, the amount of power generated in the power generation system 20 is controlled by controlling the driving of the engine 21 and the power generator inverter 24.

The system controller 31 generates command values for the drive system 10 and the power generation system 20 in accordance with the amount of acceleration pedal operation by the driver, the vehicle speed, the slope, and other parameters associated with the vehicle status inputted from the sensor group 40, and also with a state of charge inputted from the battery controller 33 and electric power that can be inputted and outputted.

The power generation control unit 311 computes a torque command value T* for the engine controller 35 and a rotational speed command value $\omega_G$* for the power generator controller 34 in order for the desired electric power to be generated in the power generation system 20. When the engine 21 is rotatably driven according to the torque command value T*, the power generator 23 co-rotates with the engine 21. The power generation control unit 311 can obtain the desired electric power from the power generation system 20 by controlling the power generator inverter 24 at the same time.

The drive motor controller 32 receives input of the states of rotational speed, voltage, and the like from the drive motor 11. On the basis of these inputs, the drive motor controller 32 controls switching of the drive inverter 15 in order to realize the torque command value T* generated by the system controller 31, so that the desired AC power is applied to the drive motor 11 and the desired torque is obtained.

The battery controller 33 is configured to be capable of two-way communication with the battery 16, and the battery controller measures the state of charge (SOC) on the basis of the current and voltage charged and discharged in the battery 16 and outputs the measurement result to the system controller 31. At the same time, the battery controller 33 computes the electric power that can be inputted to and outputted from the battery 16 in accordance with the temperature, internal resistance, SOC, and other parameters associated with the battery 16, and outputs the computation result to the system controller 31.

The power generator controller 34 is configured to be capable of detecting a rotation state of the power generator 23, and the power generator controller controls the switching of the power generator inverter 24 so that the power generator 23 rotates according to the rotational speed command value $\omega_G$* generated by the power generation control unit 311. The desired DC power can thereby be supplied from the power generation system 20 to the drive system 10.

The engine controller 35 controls a throttle, ignition timing, and fuel injection amount of the engine 21 so that the engine 21 is driven according to the torque command value T* instructed from the system controller 31, in accordance with the rotational speed and temperature of the engine 21.

The sensor group 40 includes a vehicle speed sensor 41, an accelerator position sensor 42, and a slope sensor 43. The vehicle speed sensor 41 is provided in parallel with the drive wheels 14A, 14B, and the like, and the vehicle speed sensor acquires the vehicle speed of the electric vehicle 100 by measuring rotational speeds of the drive wheels 14A, 14B. The accelerator position sensor 42 acquires the stepped amount of the acceleration pedal. The slope sensor 43 detects a slope of a road on which the electric vehicle 100 is traveling. The vehicle speed, acceleration pedal operation amount, and slope acquired by the vehicle speed sensor 41, the accelerator position sensor 42, and the slope sensor 43 are inputted to the system controller 31. The sensors included in the sensor group 40 of the present embodiment are one example, and the control system 30 may perform control in accordance with inputs from other sensors.

Figure 2:
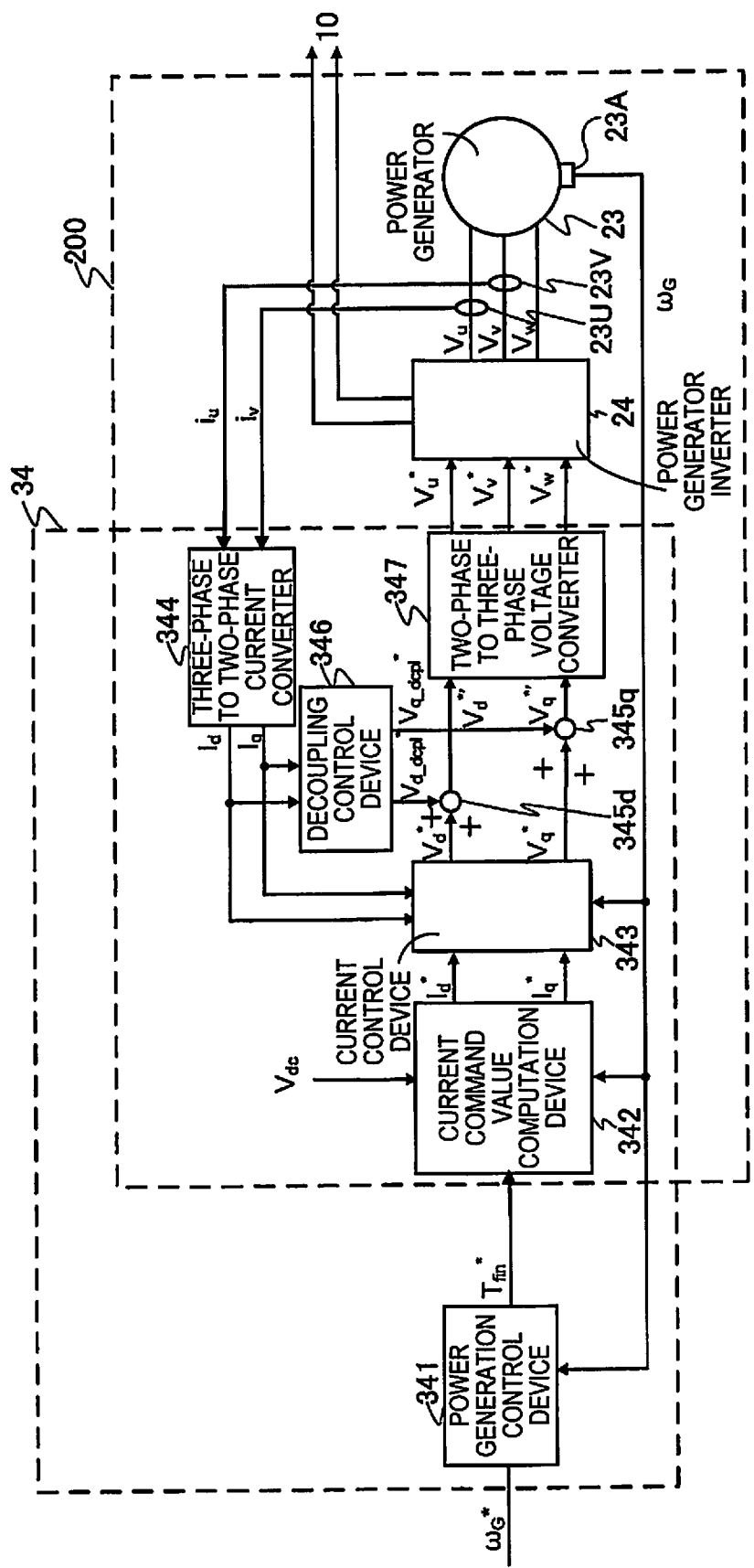
FIG. 2 is a block diagram of the details of a configuration of a power generator controller.

FIG. 2 is a block diagram of the details of the configuration of the power generator controller 34. The power generator 23 co-rotates with the engine 21 driven according to the torque command value T*. The power generator controller 34 then controls the power generator inverter 24 so that the power generator 23 rotates according to the rotational speed command value $\omega_G$*. Thus, the desired electric power is generated in the power generator 23, and the generated electric power is supplied to the drive system 10.

The power generator controller 34 includes a power generation control device 341, a current command value computation device 342, a current control device 343, a three-phase to two-phase current converter 344, dq-axis adders 345d, 345q, a decoupling control device 346, and a two-phase to three-phase voltage converter 347. Detailed operations of these components shall be described below.

The power generation control device 341 receives input of the rotational speed command value $\omega_G^*$ generated by the system controller 31 and an actual rotational speed $\omega_G$ of the power generator 23 inputted from a resolver 23A attached to the power generator 23. The power generation control device 341 generates a final torque command value $T_{fin}^*$ such that the rotational speed of the power generator 23 reaches the rotational speed command value $\omega_G^*$.

The current command value computation device 342 receives input of the final torque command value $T_{fin}^*$ generated by the power generation control device 341, a DC voltage value $V_{dc}$ used to generate a PWM signal in the power generator inverter 24, and the actual rotational speed wo detected by the resolver 23A. On the basis of these inputs the current command value computation device 342 generates dq-axis current command values $I_d^*$, $I_q^*$ for the power generator 23.

The current control device 343 receives input of the dq-axis current command values $I_d^*$, $I_q^*$ from the current command value computation device 342 and dq-axis current measurement values $I_d$, $I_q$ from the three-phase to two-phase current converter 344. The current control device 343 generates dq-axis voltage command values $V_d^*$, $V_q^*$ so that the dq-axis currents $I_d$, $I_q$ come to be equal to the dq-axis current command values $I_d^*$, $I_q^*$.

The three-phase to two-phase current converter 344 generates the dq-axis current measurement values $I_d$, $I_q$ by performing UVW-phase to dq-axis conversions on UV-axis current measurement values $i_u$, $i_v$ detected in UV-axis current sensors 23U, 23V provided between the power generator inverter 24 and the power generator 23. The total sum of UVW-phase current vectors is zero, and it is therefore possible to know the currents of all phases by measuring the currents of two phases (UV phases) of the UVW phases.

The dq-axis adders 345d, 345q are provided in a stage following the current control device 343. The dq-axis adders 345d, 345q, respectively, add dq-axis voltage command values $V_d^*$, $V_q^*$ outputted from the current control device 343 and dq-axis decoupling control command values $V_{d\_dcpl}^*$, $V_{q\_dcpl}^*$ outputted from the decoupling control device 346 to generate final dq-axis voltage command values $V_d^*$, $V_q^*$.

The decoupling control device 346 receives input of the dq-axis current measurement values $I_d$, $I_q$ from the three-phase to two-phase current converter 344, and calculates the dq-axis decoupling control command values $V_{d\_dcpl}^*$, $V_{q\_dcpl}^*$ needed to cancel out an interference component generated between the d-axis and the q-axis.

Upon receiving the final dq-axis voltage command values $V_d^*$, $V_q^*$ outputted from the dq-axis adders 345d, 345q, the two-phase to three-phase voltage converter 347 calculates UVW-phase voltage command values $V_u^*$, $V_v^*$, $V_w^*$ by performing dq-axis to UVW-phase conversion on these inputs. The two-phase to three-phase voltage converter 347 then outputs the UVW-phase voltage command values $V_u^*$, $V_v^*$, $V_w^*$ to the power generator inverter 24.

The power generator inverter 24 performs PWM control in accordance with the UVW-phase voltage command values $V_u^*$, $V_v^*$, $V_w^*$. As a result, AC power generated in the power generator 23 is converted to DC power and supplied to the drive system 10.

If the final torque command value $T_{fin}^*$ generated in the power generation control device 341 is used as a command value, the components including the current command value computation device 342 through to the two-phase to three-phase voltage converter 347, the power generator inverter 24, and the power generator 23 constitute a plant 200, which is a system to be controlled. Specifically, the plant 200 outputs generated power to the drive system 10 in response to the input of the final torque command value $T_{fin}^*$, and causes the actual rotational speed $\omega_G$ of the power generator 23 to be inputted as feedback to the power generation control device 341.

Figure 3:
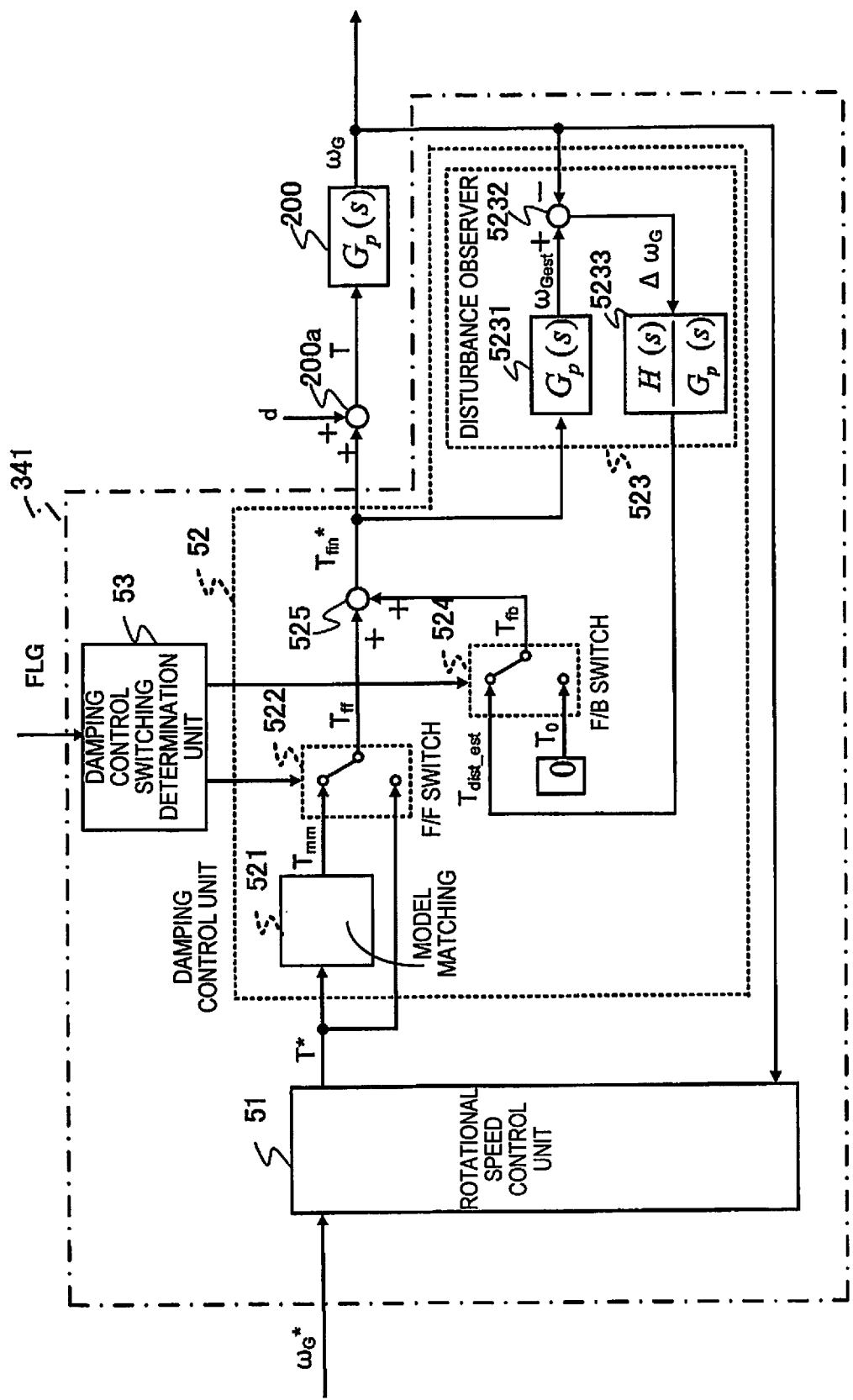
FIG. 3 is a block diagram of control performed by a power generation control device.

FIG. 3 is a block diagram of control performed by the power generation control device 341. This diagram shows the power generation control device 341 in a single-dot dashed line, and also shows the plant 200 to be controlled.

The power generation control device 341 outputs the final torque command value $T_{fin}^*$, which is a command value for the plant 200, in accordance with the input of the rotational speed command value $\omega_G^*$ from the system controller 31, the feedback input of the actual rotational speed $\omega_G$ from the power generator 23 constituting the plant 200, and input of a misfire determination flag FLG for the engine 21. The misfire determination flag FLG is detected due to, e.g., an abnormality in the rotational speed of the engine 21 being detected in the system controller 31. The detailed configuration of the power generation control device 341 shall be described below.

The power generation control device 341 includes a rotational speed control unit 51, a damping control unit 52, and a damping control switching determination unit 53.

The rotational speed control unit 51 receives the rotational speed command value $\omega_G^*$ generated by the system controller 31 (not shown in FIG. 3) and the actual rotational speed $\omega_G$ of the power generator 23, which is part of the plant 200. The rotational speed control unit 51, for example, performs PI control so that the actual rotational speed coo reaches the rotational speed command value $\omega_G^*$, and generates a torque command value T* for performing rotational speed control. The torque command value T* is outputted to the damping control unit 52.

Feedforward (F/F) control and feedback (F/B) control are performed in the damping control unit 52. Specifically, the damping control unit 52 has a model matching unit 521 and an F/F switch 522 associated with F/F control, and a disturbance observer 523 and an F/B switch 524 associated with F/B control.

The model matching unit 521 is configured from a Gm(s)/Gp(s) filter, and the model matching unit performs F/F control to suppress vibration in a transmission system. Specifically, due to a Gm(s)/Gp(s) filter process being performed on the torque command value T*, F/F control having a high damping effect is performed and a model matching torque $T_{mm}$ is generated. Gp(s) is a model indicating a transmission characteristic whereby torque T is inputted and a rotational speed $\omega_G$ is outputted in the plant 200 (power generator 23). Gm(s) is a model (ideal model) indicating a transmission characteristic whereby torque T is inputted and a rotational speed $\omega_G$ is outputted in an ideal plant 200.

The F/F switch 522, in accordance with the input from the damping control switching determination unit 53, switches between whether or not the filter process is being performed by the model matching unit 521 on the torque command value T* outputted from the rotational speed control unit 51. When the F/F switch 522 is on, the model matching torque $T_{mm}$ passed through the model matching unit 521 is outputted as F/F torque $T_{ff}$. When the F/F switch 522 is off, the torque command value T* is outputted as F/F torque $T_{ff}$.

without passing through the model matching unit 521. The F/F torque $T_{\textit{ff}}$ is one example of a first command value.

The disturbance observer 523 includes a disturbance estimation block 5231, a subtractor 5232, and an F/B filter 5233. The disturbance observer 523 calculates a disturbance estimation torque $T_{dist\_est}$ on the basis of the final torque command value Tim* from the F/F switch 522 and the input of the actual rotational speed $\omega_G$ from the plant 200. The detailed configuration is as follows.

The disturbance estimation block 5231 calculates an estimated rotational speed value $\omega_{Gest}$ by performing a process using the transmission characteristic Gp(s) of the plant 200 on the final torque command value $T_{fin}*$ outputted from the F/F switch 522.

The subtractor 5232 calculates a deviation $\Delta\omega_G$ by subtracting the actual rotational speed $\omega_G$ outputted from the plant 200 from the estimated rotational speed value $\omega_{Gest}$ calculated by the disturbance estimation block 5231. The estimated rotational speed value $\omega_{Gest}$ is a value corresponding to a command value and the actual rotational speed coo is a measurement value, and F/B control can therefore be performed on the basis of the deviation $\Delta\omega_G$ therebetween.

The F/B filter 5233 calculates the disturbance estimation torque $T_{dist\_est}$ by performing a filter process on the deviation $\Delta\omega_G$ calculated by the subtractor 5232. The F/B filter 5233 is an H(s)/Gp(s), and is configured from a 1/Gp(s), which is an inverse of the transmission characteristic Gp(s) of the plant 200, and a bandpass filter H(s) of which a central frequency matches a resonance frequency of the plant 200. The resonance frequency of the plant 200 is a resonance frequency resulting from torsional vibration occurring in the attenuator 22.

The F/B switch 524 switches between whether or not the disturbance estimation torque $T_{dist\_est}$ calculated by the disturbance observer 523 is being applied, in accordance with the input from the damping control switching determination unit 53. When the F/B switch 524 is on, the disturbance estimation torque $T_{dist\_est}$ is outputted as F/B torque $T_{fb}$. When the F/B switch 524 is off, zero torque $T_0$ is outputted as the F/B torque $T_{fb}$. The F/B torque $T_{fb}$ is an example of a second command value.

An adder 525 adds the F/F torque $T_{\textit{ff}}$ outputted from the F/F switch 522 and the F/B torque $T_{fb}$ outputted from the F/B switch 524, and outputs the final torque command value $T_{fin}*$. The final torque command value $T_{fin}*$ outputted from the adder 525 is inputted to the plant 200 after being affected by disturbance d. In this diagram, the disturbance d is shown in modeled form so as to have an effect via an adder 200a.

The damping control switching determination unit 53 switches the F/F switch 522 and the F/B switch 524 in the damping control unit 52. The details of this switching control are shown in FIG. 4.

Figure 4:
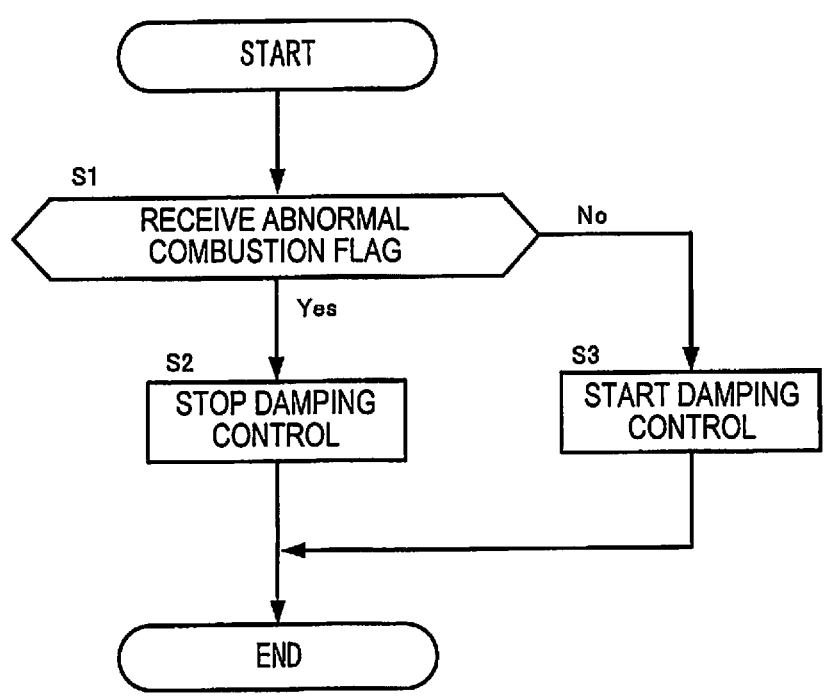
FIG. 4 is a flowchart of switching control for damping control.

FIG. 4 is a flowchart of damping control switching control performed by the damping control switching determination unit 53. The damping control switching control is stored as a program in the controller constituting the control system 30.

In step S1, the damping control switching determination unit 53 determines whether or not the misfire determination flag FLG indicating a misfire of the engine 21 has been received from the system controller 31. When the misfire determination flag FLG is received (S1: Yes), the damping control switching determination unit 53 next performs the process of step S2. When the misfire determination flag FLG is not received (S1: No), the damping control switching determination unit 53 next performs the process of step S3.

In step S2, the damping control switching determination unit 53 turns both the F/F switch 522 and the F/B switch 524 off and stops both F/F and F/B damping control.

In step S3, the damping control switching determination unit 53 turns both the F/F switch 522 and the F/B switch 524 on and starts both F/F and F/B damping control.

Thus, during normal operation in which the misfire determination flag FLG has not been received, the damping control switching determination unit 53 operates with both the F/F switch 522 and the F/B switch 524 on. Specifically, F/F control and F/B control are performed, the model matching torque $T_{mm}$ is outputted as F/F torque $T_{ff}$, and the disturbance estimation torque $T_{dist\_est}$ is outputted as F/B torque $T_{fb}$. It is thereby possible to simultaneously suppress the torsional natural vibration component in the attenuator 22 and as (torque pulsation and the like) from the engine 21.

When the misfire determination flag FLG has been received, the damping control switching determination unit 53 operates with both the F/F switch 522 and the F/B switch 524 off. Specifically, F/F control and F/B control are not performed, the torque command value T* used in rotational speed control is outputted as F/F torque $T_{ff}$, and zero torque $T_0$ is outputted as F/B torque $T_{fb}$.

When the engine 21 misfires, a periodic disturbance other than the natural vibration component of the plant 200 occurs. Therefore, there is a risk that damping will not be possible even with the use of F/F control using the transmission characteristic Gp(s) of the plant 200 and F/B control using the output from the plant 200. As a result, periodic disturbance other than the natural vibration component occurs in a state in which a torsion angle in the attenuator 22 exceeds an allowable range, and when damping control is performed, system resonance occurs as a result of the periodic disturbance. Such a phenomenon in the attenuator 22 is referred to as "bottoming out."

Thus, system resonance is avoided due to the damping control switching determination unit 53 turning both the F/F switch 522 and the F/B switch 524 off, and as a result, inputting of the torsion angle in the attenuator 22 does not exceed the allowable range, and the occurrence of bottoming out can be suppressed. Therefore, the occurrence of system resonance can be prevented.

Figure 5:
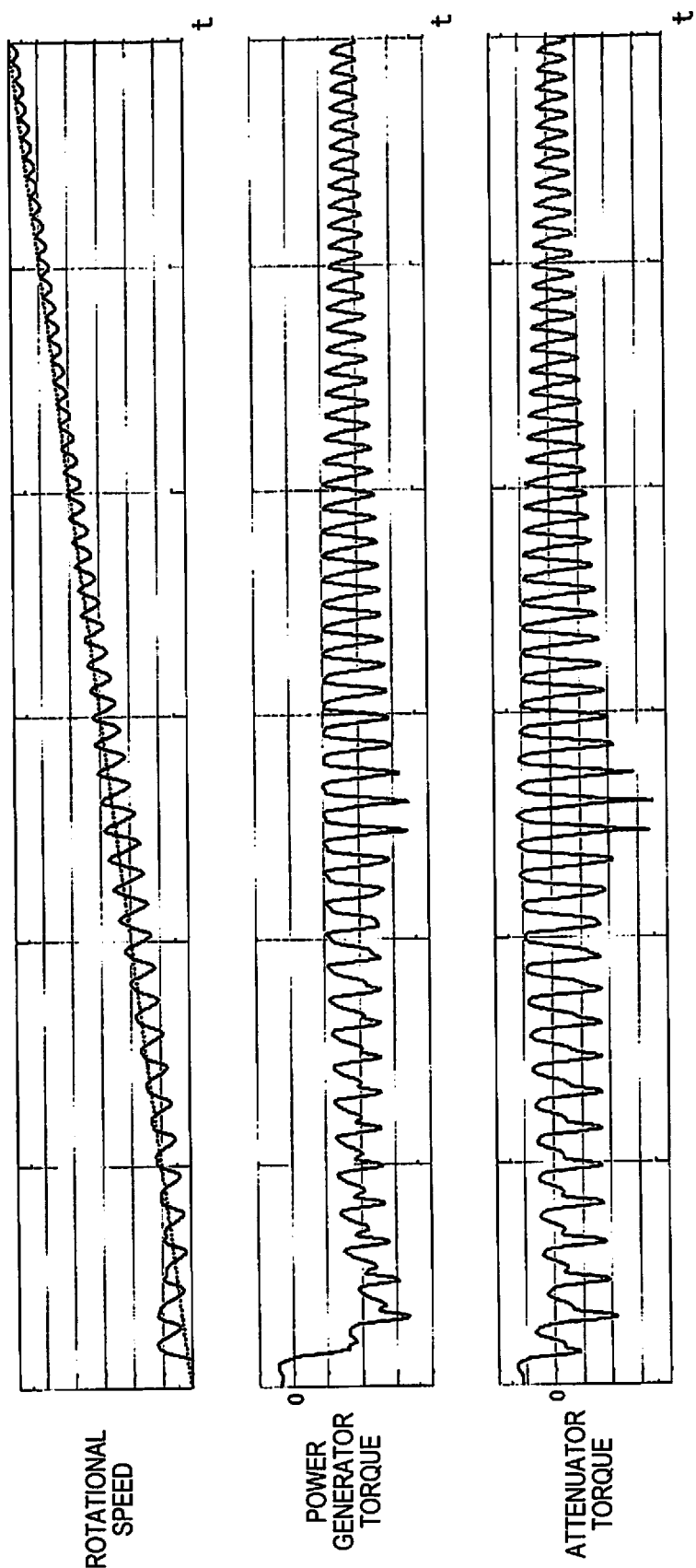
FIG. 5 is a timing chart of drive states of a power generation system of a comparative example.
Figure 6:
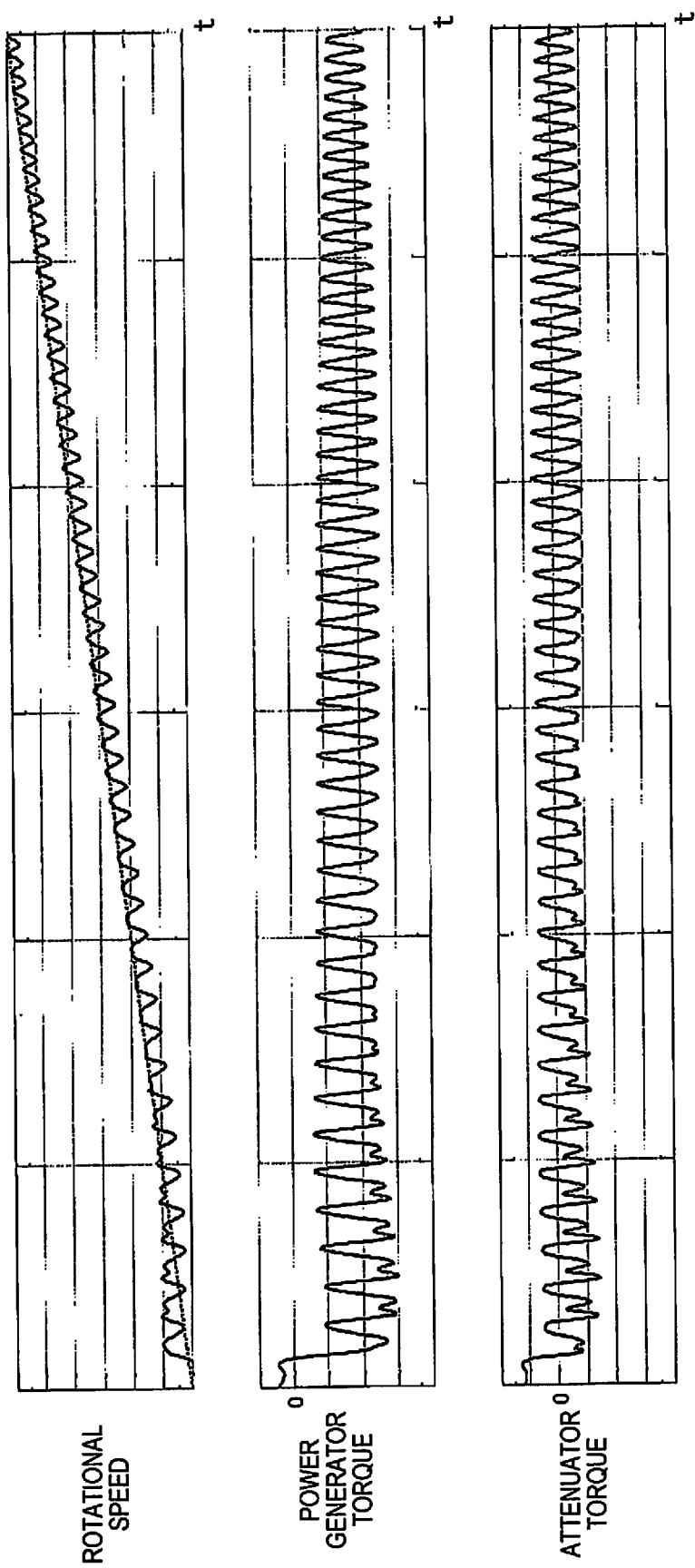
FIG. 6 is a timing chart of drive states of a power generation system of the present embodiment.

The following is a description, given using FIGS. 5 and 6, of the effect obtained by performing a damping control switching determination such as is shown in the present embodiment.

FIG. 5 is a timing chart of drive states of a power generation system 20 of a comparative example. In the example in this chart, a damping control switching determination unit 53 such as that of the present embodiment is not provided, and damping control using F/F control and F/B control is performed in all time slots.

FIG. 6 is a chart of drive states of the power generation system 20 of the present embodiment. Therefore, the damping control switching determination unit 53 is provided and damping control is stopped when the engine 21 misfires.

FIGS. 5 and 6 both show changes in three parameters: from the top down, the rotational speed of the engine 21, the drive torque of the power generator 23, and the torsional torque of the attenuator 22. Specifically, these charts show the torque generated in the power generator 23 and the torsional torque in the attenuator 22 when the rotational speed of the engine 21 is swept so as to increase over time.

Comparing the two, the amplitude generated in the torque in the example of FIG. 6 is smaller than that of the example of FIG. 5, particularly in the time slot near the center of the charts. Therefore, because the torque in the attenuator 22 does not exceed the allowable range (there is no bottoming out), any increase in the torsion angle of the shaft between the engine 21 and the power generator 23 is minimized, and it is possible to minimize the occurrence of system resonance caused by components other than the characteristic frequency.

In the present embodiment, an example was described in which the rotational speed of the power generator 23 is the object of control in the control of the actual rotational speed $\omega_G$ of the power generator controller 34, but this examples is not provided by way of limitation. The power generator controller 34 may control the rotational speed of the engine 21.

According to the first embodiment, the following effects are obtained.

The electric vehicle 100 in which the control method of the first embodiment is used is a series hybrid vehicle in which the drive system 10 and the power generation system 20 are connected in series, and control of the rotational speed of the power generator 23 of the power generation system 20 is performed using the final torque command value $T_{fin}^*$.

The power generation control unit 311 of the system controller 31 derives the rotational speed command value $\omega_G^*$ derived in accordance with the state of the drive system 10. In the power generation control device 341, the rotational speed control unit 51 derives the torque command value $T^*$ so that the actual rotational speed $\omega_G$ of the power generator 23 reaches the rotational speed command value $\omega_G^*$, and the damping control unit 52 performs damping control on the torque command value $T^*$, whereby the final torque command value $T_{fin}^*$ is calculated.

For example, when the engine 21 misfires and system resonance occurs in the plant 200 as a result of a component other than the characteristic frequency, there is a risk that the torsion angle in the attenuator 22 will exceed the allowable range and vibration (periodic disturbance) other than the natural vibration component will occur. When this vibration occurs, system resonance will occur when damping control removing the natural vibration component is performed. Therefore, in cases such as when there could be vibration (periodic disturbance) that could cause system resonance, i.e., misfiring of the engine 21 is detected, the system resonance can be suppressed by switching the damping control switching determination unit 53 so as to not perform damping control.

In particular, when system resonance occurs, the torsion angle in the attenuator 22 connecting the engine 21 and the power generator 23 exceeds the allowable range, and there is a risk that the torque of the engine 21 will not be properly transmitted to the power generator 23 and there will be pronounced vibration and noise. However, due to the damping control switching determination unit 53 turning damping control off, system resonance is suppressed and abnormality in the torque transmission in the attenuator 22 can therefore be suppressed.

Conversely, when misfiring of the engine 21 is not confirmed and the damping control switching determination unit 53 is not receiving a misfire flag, the switches 522, 524 are turned on and damping control is performed. As a result, damping control can be performed on the torsional natural vibration component of the attenuator 22 and on periodic disturbance (torque pulsation and the like) from the engine 21.

According to the method for controlling the electric vehicle 100 of the first embodiment, in the damping control unit 52, the model matching unit 521 calculates the model matching torque $T_{mm}$, which is the first command value, by performing feedforward control to reduce the torsional vibration component, the deviation $\Delta\omega_G$ between the actual rotational speed $\omega_G$ and the estimated rotational speed value $\omega_{Gest}$ derived on the basis of the final torque command value $T_{fin}^*$ is estimated as disturbance, and the disturbance estimation torque $T_{dist\_est}$, which is the second command value, is derived by performing feedback control so that the disturbance is suppressed. The adder 525 then calculates the final torque command value $T_{fin}^*$ by adding the model matching torque $T_{mm}$ and the disturbance estimation torque $T_{dist\_est}$. Thus, more effective damping control can be performed by combining F/F control and FB control.

By performing such damping control, the torsional natural vibration component of the attenuator 22 and periodic disturbance (torque pulsation and the like) from the engine 21 can be suppressed when system resonance does not occur; therefore, the natural vibration component of the plant 200 is suppressed and the power generation system 20 can be stably driven.

Second Embodiment

In the first embodiment, an example was described in which damping control is suppressed when the engine 21 misfires, but this example is not provided by way of limitation. In the second embodiment, an example is described of a case in which a condition of suppressing damping control is that rotational speed be comparatively high.

Figure 7:
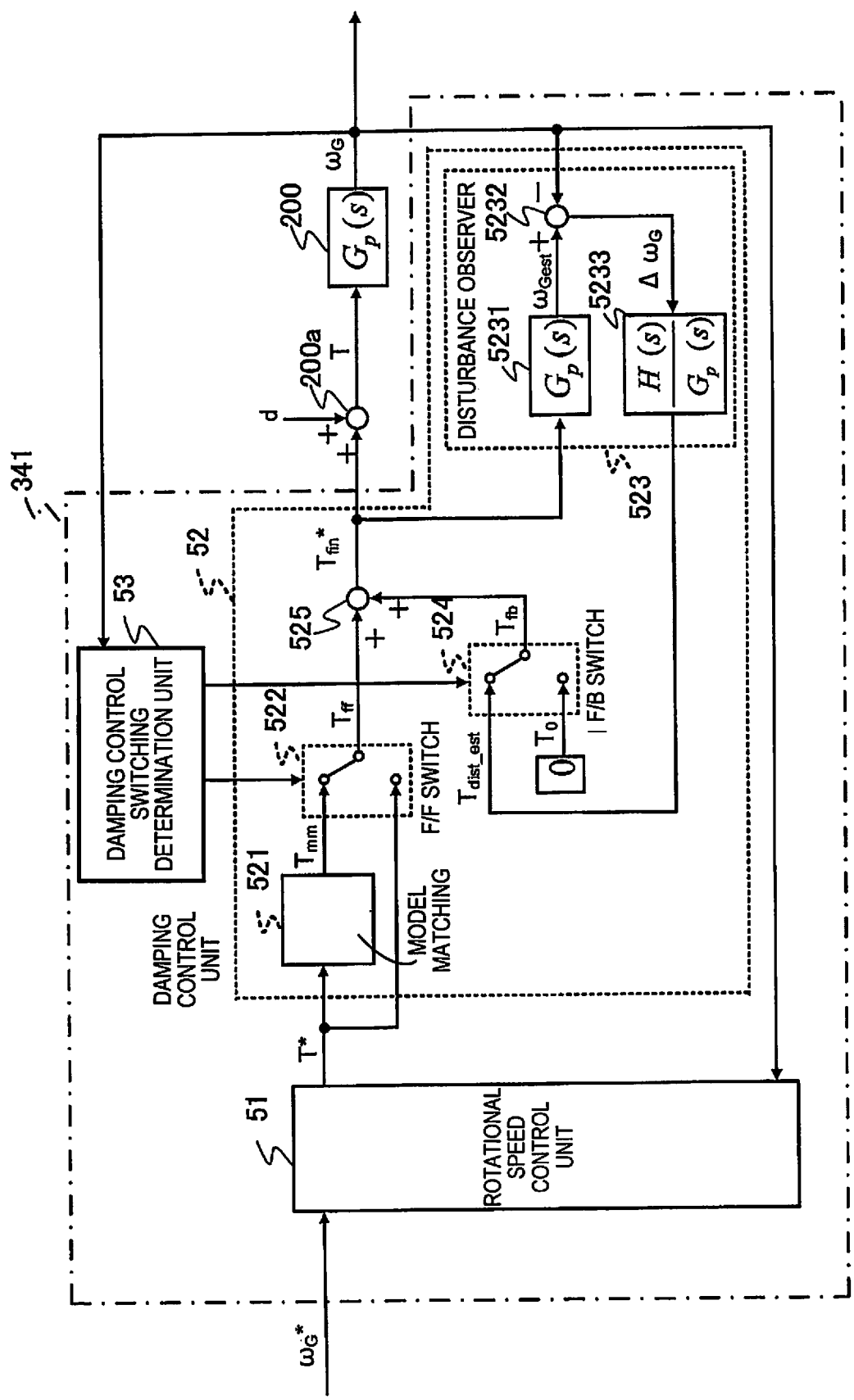
FIG. 7 is a block diagram of control performed by a power generation control device according to a second embodiment.

FIG. 7 is a block diagram of control performed by the power generation control device 341 of the second embodiment. Comparing this block diagram with the block diagram relating to the power generation control device 341 of the first embodiment shown in FIG. 3, the input to the damping control switching determination unit 53 is changed to the rotational speed $\omega_G$ outputted from the plant 200.

Figure 8:
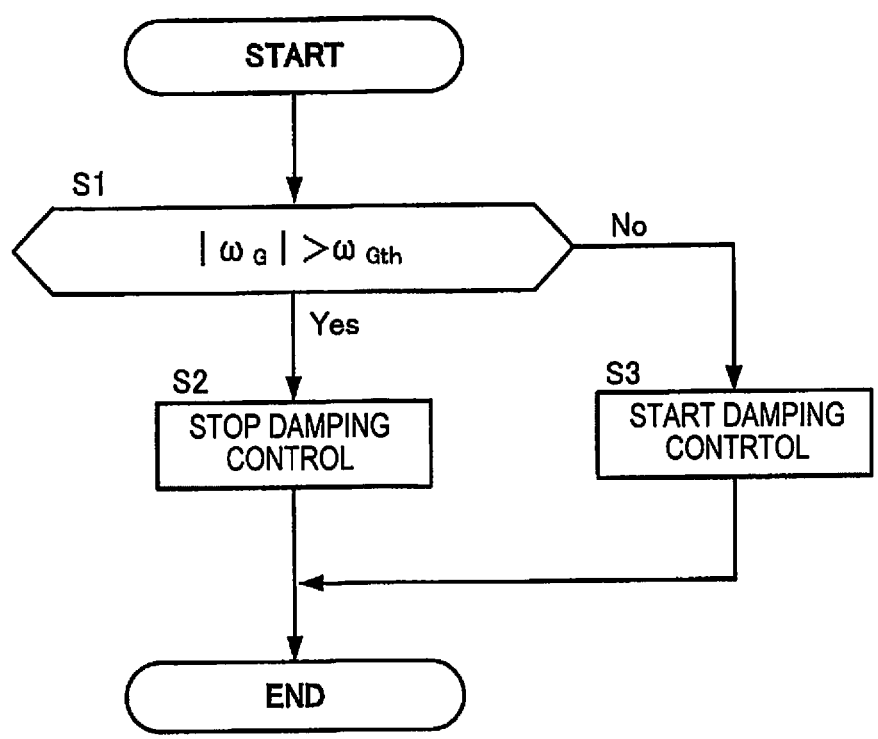
FIG. 8 is a flowchart of switching control for damping control.

FIG. 8 is a flowchart of damping control switching control performed by the damping control switching determination unit 53.

In step S1, the damping control switching determination unit 53 determines whether or not the rotational speed $\omega_G$ outputted from the plant 200 is greater than a predetermined threshold value $\omega_{Gth}$. The threshold value $\omega_{Gth}$ in this embodiment is a rotational speed of the power generator 23 at which there is a high possibility of misfiring of the engine 21 and the like. Therefore, when the rotational speed $\omega_G$ of the engine 21 is greater than the predetermined threshold value $\omega_{Gth}$, there is a high possibility of system resonance occurring.

When the rotational speed $\omega_G$ is greater than the predetermined threshold value $\omega_{Gth}$ (S1: Yes), the damping control switching determination unit 53 next performs the process of step S2 and suppresses damping control. When the rotational speed $\omega_G$ is not greater than the predetermined threshold value $\omega_{Gth}$ (S1: No), the damping control switching determination unit 53 next performs the process of step S3 and performs damping control.

Thus, when the rotational speed $\omega_G$ is comparatively low, the damping control switching determination unit 53 operates with both the F/F switch 522 and the F/B switch 524 on. When the rotational speed $\omega_G$ is comparatively high, the damping control switching determination unit 53 operates with both the F/F switch 522 and the F/B switch 524 off.

The engine 21, unlike a comparatively large engine connected to drive wheels, is used only for power generation and therefore has a high possibility of misfiring. When the engine 21 misfires, there is a risk that vibration (periodic disturbance) other than the natural vibration component will occur and system resonance will occur. Therefore, the system resonance can be reduced by suppressing damping control in cases in which the rotational speed $\omega_G$ of the power generator 23 is comparatively high, such as when combustion is occurring in the engine 21. As a result, occurrences of pronounced vibration (bottoming out) can be suppressed as a result of avoiding inputting of a torsion angle in the allowable range in the attenuator 22. When the rotational speed $\omega_G$ of the power generator 23 is comparatively low, a motoring stage is entered, during which combustion in the engine 21 has not been started, vibration (periodic disturbance) does not readily occur, and system resonance does not readily occur. Therefore, vibration of the natural vibration component can be suppressed by performing damping control, and vibration of the entire system can be reduced.

To compare the rotational speed $\omega_G$ and the combustion state during startup of the engine 21, first the power generator 23 is driven as a starter and rotation is started (motoring). Then, the rotational speed $\omega_G$ increases, ignition occurs in the engine 21, and when the rotational speed $\omega_G$ further increases, combustion (firing) stably occurs in the engine 21. After ignition has occurred in the engine 21, there is a high possibility that the engine 21 will misfire and system resonance will occur. Therefore, the threshold value $\omega_{Gth}$ is set as the rotational speed at which combustion after motoring will be started and damping control is turned off when the rotational speed $\omega_G$ is greater than the threshold value $\omega_{Gth}$, whereby system resonance resulting from misfiring can be suppressed, and as a result, bottoming out of the attenuator 22 can be prevented.

According to the second embodiment, the following effects can be obtained.

According to the method for controlling the electric vehicle 100 of the second embodiment, when the rotational speed $\omega_G$ after the engine 21 starts up is comparatively high, damping control is suppressed because there is a high risk that system resonance resulting from vibration (periodic disturbance) other than the natural vibration component will occur due to misfiring of the engine 21 or the like. Occurrences of system resonance are thereby suppressed, and as a result, inputting of a torsion angle in the allowable range in the attenuator 22 is avoided, and occurrences of pronounced vibration resulting from bottoming out can be suppressed.

When the rotational speed $\omega_G$ is comparatively low, it can be assumed that the engine 21 is in a motoring state. Therefore, vibration other than the natural vibration component does not readily occur, system resonance does not readily occur, and vibration can be reduced by performing damping control. As a result, a command value that has undergone damping control is inputted to the plant 200, and it is therefore possible to achieve a damping effect for the torsional natural vibration component of the attenuator 22 and for periodic disturbance from the engine 21 (engine torque pulsation or the like).

In addition, the time needed to determine switching in damping control is reduced by using the rotational speed $\omega_G$, in contrast to when a misfire determination is performed. As a result, when periodic disturbance occurs, damping control can be turned off sooner, and occurrences of system resonance can therefore be suppressed.

According to the method for controlling the electric vehicle 100 of the second embodiment, the threshold value $\omega_{Gth}$ used to determine switching in damping control using the rotational speed $\omega_G$ can be set at the boundary between the rotational speed at which motoring is performed and the rotational speed at which combustion (firing) starts after motoring. When the rotational speed $\omega_G$ is greater than the threshold value coati, a stage is entered at which firing of the engine 21 is started, and the possibility of system resonance occurring as a result of misfiring is therefore higher than in the motoring state. Therefore, occurrences of system resonance resulting from misfiring can be suppressed by turning damping control off. Conversely, when the rotational speed $\omega_G$ is lower than the threshold value $\omega_{Gth}$, motoring is performed; therefore, the possibility of misfiring of the engine 21 is low and the possibility of system resonance occurring is low. Therefore, the natural vibration component can be suppressed by turning damping control on.

Third Embodiment

In the second embodiment, an example was described of a case in which a condition of suppressing damping control is that rotational speed be comparatively high, but this example is not provided by way of limitation. In a third embodiment, an example is described in which a condition of suppressing damping control is that the output of the plant 200 (engine 21/power generator 23) be used.

Figure 9:
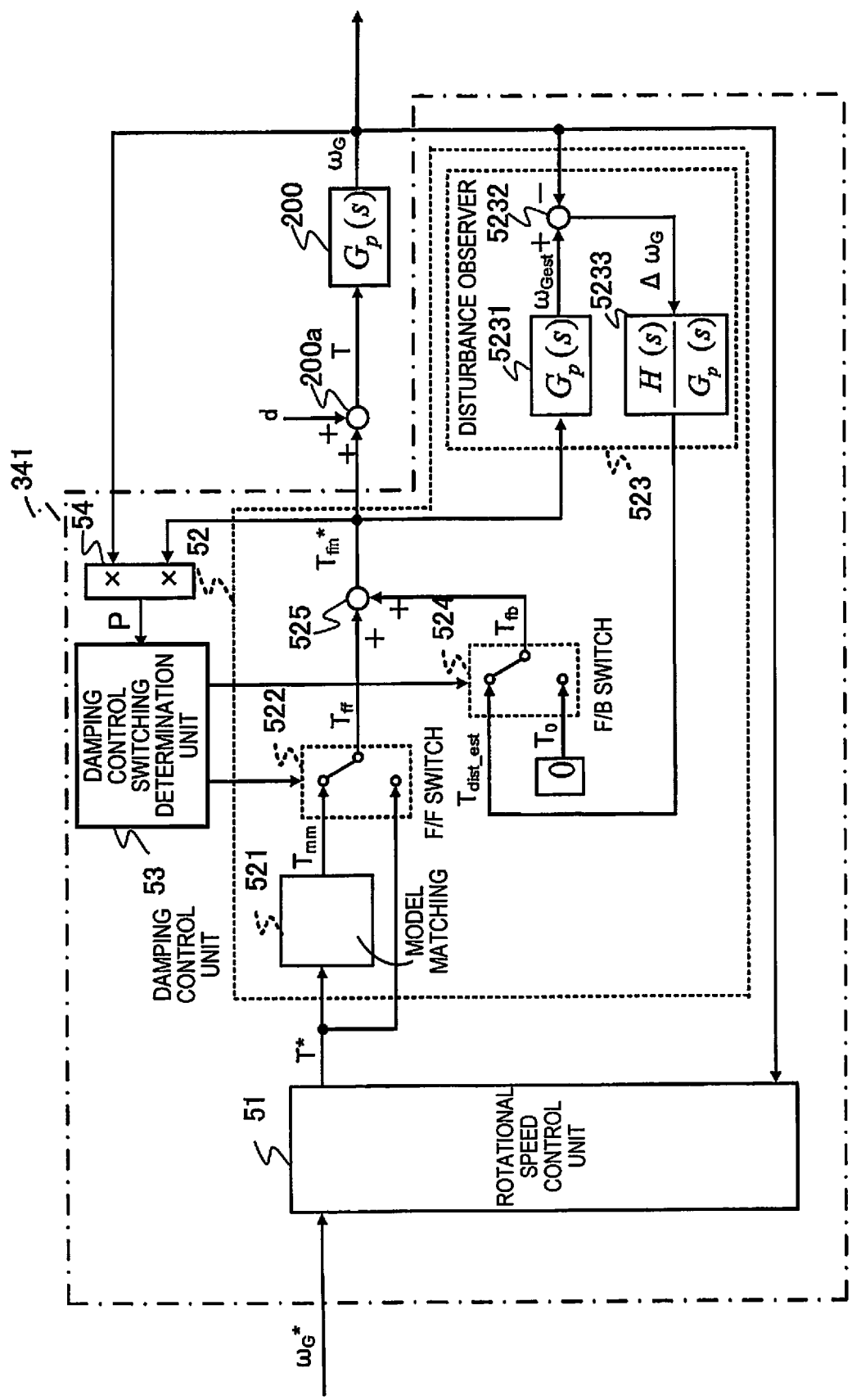
FIG. 9 is a block diagram of control performed by a power generation control device according to a third embodiment.

FIG. 9 is a block diagram of control performed by the power generation control device 341 of the third embodiment. Comparing this block diagram with the block diagram relating to the power generation control device 341 of the second embodiment shown in FIG. 3, the output of the plant 200 is inputted to the damping control switching determination unit 53 from the integrator 54.

Specifically, the integrator 54, upon receiving inputs of the rotational speed $\omega_G$ from the plant 200 and the final torque command value $T_{fin}*$ from the adder 525, integrates the two inputs and outputs an output P to the damping control switching determination unit 53.

Figure 10:
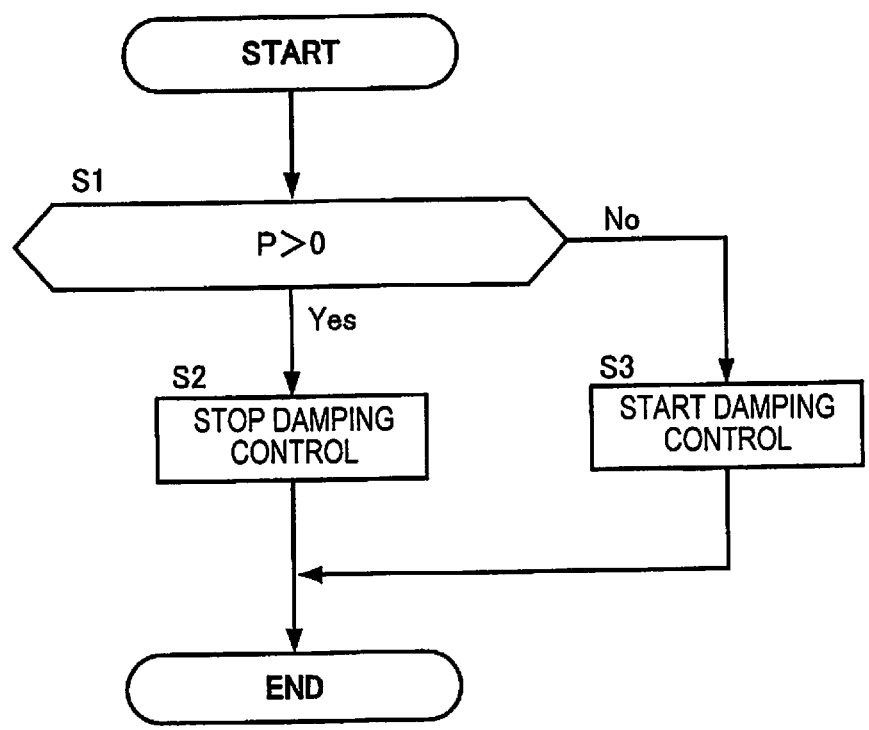
FIG. 10 is a flowchart of switching control for damping control.

FIG. 10 is a flowchart of damping control switching control performed by the damping control switching determination unit 53.

In step S1, the damping control switching determination unit 53 determines whether or not the output P of the plant 200 is positive. When the output P is positive (S1: Yes), the damping control switching determination unit 53 next performs the process of step S2 and suppresses damping control. Conversely, when the output P is negative (S1: No), the damping control switching determination unit 53 next performs the process of step S3 and performs damping control.

Thus, when the output P is positive, the damping control switching determination unit 53 operates with both the F/F switch 522 and the F/B switch 524 on, Conversely, when the output P is negative, the damping control switching determination unit 53 operates with both the F/F switch 522 and the F/B switch 524 off.

In this embodiment, when the output P is positive, the power generator 23 is in a generating state and the engine 21 is motoring. Therefore, the risk of system resonance resulting from misfiring is low, and the vibration of the plant 200 can therefore be suppressed by turning damping control on. When the output P is negative, the power generator 23 generates power and combustion in the engine 21 proceeds. Therefore, the risk of system resonance resulting from misfiring is higher than in the motoring state, and damping control is therefore turned off. As a result, inputting of a torsion angle in the allowable range in the attenuator 22 is avoided, occurrences of pronounced vibration are suppressed, and as a result, it is possible to minimize occurrences of system resonance resulting from vibration (periodic disturbance) other than the natural vibration component.

In the third embodiment, the product of the rotational speed COG and the final torque command value $T_{fin}^*$ is the output P, but this example is not provided by way of limitation. For example, the products of the dq-axis currents $I_d$, $I_q$ outputted from the three-phase to two-phase current converter 344 of FIG. 2 and the dq-axis voltage command values $V_d^*$, $V_q^*$ outputted from the dq-axis adders 345*d*, 345*q* ($I_d \times V_d + I_q \times V_q^*$) may be the output P.

According to the third embodiment, the following effects can be obtained.

According to the method for controlling the electric vehicle 100 of the third embodiment, when the output P of the power generator 23 is low, the power generator 23 generates power, and therefore the engine 21 fires. Damping control is suppressed because there is a high risk that system resonance will occur as a result of vibration (periodic disturbance) other than the natural vibration component due to misfiring or the like. Occurrences of system resonance are thereby minimized, and as a result, inputting of a torsion angle in the allowable range in the attenuator 22 is avoided, and occurrences of pronounced vibration are minimized. As a result, it is possible to minimize occurrences of system resonance resulting from vibration other than the natural vibration component. Conversely, when the output P of the power generator 23 is comparatively high, the engine 21 is motoring, vibration other than the natural vibration component does not readily occur, and system resonance does not readily occur; therefore, vibration can be reduced by performing damping control.

According to the method for controlling the electric vehicle 100 of the third embodiment, a threshold value $P_{th}$ used to determine switching in damping control using the output P of the power generator 23 is set to zero. The firing/motoring state of the engine 21 and the power generation/regeneration state of the power generator 23 are thereby caused to correspond. As a result, when the output of the power generator 23 is positive and power is being generated, combustion is beginning in the engine 21, the probability of misfiring is therefore higher, and it is therefore possible to minimize occurrences of system resonance by turning damping control off.

A switch is made between whether to perform or not perform damping control using the misfire determination flag FLG in the first embodiment, the rotational speed $\omega_G$ in the second embodiment, and the output P of the plant 200 in the third embodiment, but these examples are not provided by way of limitation. When there is a risk of system resonance occurring as a result of vibration (periodic disturbance) other than the natural vibration component of the plant 200, the system resonance can be minimized by omitting damping control.

The determination conditions in the first through third embodiments may be used separately or may be combined to determine whether or not to perform damping control.

The present invention is not limited to the above embodiments; it is obvious that various changes can be made within the range of the technical ideas described in the claims.

The invention claimed is:

1. A hybrid vehicle control method for controlling a hybrid vehicle having a power generation system in which an engine and a drive shaft are connected and which includes a power generator configured to rotate together with the engine, and a drive system that is connected to the power generation system and driven by receiving electric power supplied from a chargeable battery, the hybrid vehicle control method comprising:
    determining a rotational speed command value for the power generation system in accordance with a state of the drive system;
    determining a torque command value for the power generation system such that a rotational speed of the power generation system reaches the rotational speed command value;
    determining whether a damping control suppressing condition is satisfied;
    performing a damping control on the torque command value to suppress a characteristic vibration component generated in a connection between the engine and the power generator and calculate a final torque command value for the power generation system upon determining that the damping control suppressing condition is not satisfied; and
    setting the torque command value as the final torque command value without performing the damping control upon determining that the damping control suppressing condition is satisfied,
    the damping control suppressing condition being a condition under which there is a high possibility that a system resonance caused by vibration of a component different from the characteristic vibration component will occur.

2. The hybrid vehicle control method according to claim 1, wherein
    the performing of the damping control includes
    calculating a first command value by subjecting the torque command value to feedforward control to reduce the characteristic vibration component,
    determining a disturbance from a difference between a rotational speed measurement value and an estimated rotational speed value estimated based on the final torque command value,
    calculating a second command value by performing feedback control so that the disturbance is suppressed, and
    calculating the final torque command value by adding the first command value and the second command value.

3. The hybrid vehicle control method according to claim 1, wherein
    the damping control suppressing condition is satisfied when a misfiring of the engine is detected.

4. The hybrid vehicle control method according to claim 1, wherein
    the damping control suppressing condition is satisfied when the rotational speed of the engine exceeds a rotational speed threshold value.

5. The hybrid vehicle control method according to claim 4, wherein
    the rotational speed threshold value is a rotational speed at which stable combustion in the engine is started.

6. The hybrid vehicle control method according to claim 1, wherein
    the damping control suppressing condition is satisfied when an output of the power generation system exceeds an output threshold value.

7. The hybrid vehicle control method according to claim 6, wherein
    the output threshold value is zero.

8. A hybrid vehicle control device for controlling a hybrid vehicle having a power generation system in which an engine and a drive shaft are connected and which includes a power generator configured to rotate together with the engine, and a drive system that is connected to the power generation system and driven by receiving electric power supplied from a chargeable battery, the hybrid vehicle control device comprising:

a controller configured to control the power generation system, wherein the controller is further configured to determine a rotational speed command value for the power generation system in accordance with a state of the drive system, determine a torque command value for the power generation system such that a rotational speed of the power generation system reaches the rotational speed command value;

determine whether a damping control suppressing condition is satisfied, perform a damping control on the torque command value to suppress a characteristic vibration component generated in a connection between the engine and the power generator and calculate a final torque command value for the power generation system upon determining that the damping control suppressing condition is not satisfied, and set the torque command value as the final torque command value without performing the damping control upon determining that the damping control suppressing condition is satisfied, the damping control suppressing condition being a condition under which there is a high possibility that a system resonance caused by vibration of a component different from the characteristic vibration component will occur.

* * * * *